US012726582B2

(12) United States Patent
Wu

(10) Patent No.: US 12,726,582 B2
(45) Date of Patent: Sep. 1, 2026

(54) VEHICLE-BASED MONITORING SYSTEM, VEHICLE-BASED MONITORING METHOD, AND DRONE

(71) Applicant: Qisda Corporation, Taoyuan City (TW)

(72) Inventor: Po-Fu Wu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 275 days.

(21) Appl. No.: 18/443,339

(22) Filed: Feb. 16, 2024

(65) Prior Publication Data

US 2024/0323321 A1 Sep. 26, 2024

(30) Foreign Application Priority Data

Mar. 20, 2023 (CN) ........................ 202310267252.X

(51) Int. Cl.
*H04N 5/265* (2006.01)

(52) U.S. Cl.
CPC .................................. *H04N 5/265* (2013.01)

(58) Field of Classification Search
CPC ........ H04N 5/265; H04N 7/181; H04N 7/185; H04N 5/2624; B64D 47/08
See application file for complete search history.

(56) References Cited

U.S. PATENT DOCUMENTS

2019/0320184 A1* 10/2019 Zhu ...................... H04N 19/166
2019/0327463 A1* 10/2019 Zhao .................... H04N 19/103
2023/0008631 A1* 1/2023 Chida ................ G06Q 30/0272

FOREIGN PATENT DOCUMENTS

CN 115423994 A * 12/2022 ............. G06V 10/12

* cited by examiner

*Primary Examiner* — John B Strege
(74) *Attorney, Agent, or Firm* — JCIPRNET

(57) ABSTRACT

A vehicle-based monitoring system, a vehicle-based monitoring method, and a drone are provided. The monitoring method includes: capturing a first image by a first image capture device of the vehicle; extending a feedback interval of the first image by the vehicle in response to a first included angle between a first line of sight of the first image capture device and a travel direction of the vehicle being greater than an angle threshold; and feedbacking the first image according to the feedback interval by the vehicle.

18 Claims, 5 Drawing Sheets

Capturing a first image by a first image capture device of the vehicle — S401

↓

Extending a feedback interval of the first image by the vehicle in response to a first included angle between a first line of sight of the first image capture device and a travel direction of the vehicle being greater than an angle threshold — S402

↓

Feedbacking the first image according to the feedback interval by the vehicle — S403

VEHICLE-BASED MONITORING SYSTEM, VEHICLE-BASED MONITORING METHOD, AND DRONE

CROSS-REFERENCE TO RELATED APPLICATION

This application claims the priority benefit of China application serial no. 202310267252.X, filed on Mar. 20, 2023. The entirety of the above-mentioned patent application is hereby incorporated by reference herein and made a part of this specification.

BACKGROUND

Technical Field

The disclosure relates to a wireless communication technology, and in particular relates to a vehicle-based monitoring system, a vehicle-based monitoring method, and a drone.

Description of Related Art

With the popularization of 5G network and drone technology, more and more people are beginning to use drones to conduct surround view live broadcasts to monitor vast areas in real time. The use of drones for surround view live broadcast has many advantages, such as providing immersive experience for viewers, allowing operators to obtain image information of dangerous terrain or complex environments, or allowing operators to complete specific tasks remotely while away from high-risk environments.

However, there are also many disadvantages in using drones for surround view live broadcasting. For example, excessive latency in network transmission or overly high speeds of drone flight may result in a discrepancy between the images viewed by the operator and the actual environment where the drone is located, thus preventing the operator from maneuvering the drone to avoid obstacles in real time. Therefore, how to improve the transmission efficiency of the image data captured by the drone is one of the important issues in this field.

SUMMARY

A vehicle-based monitoring system, a vehicle-based monitoring method, and a drone, which may improve the transmission efficiency of image data fed back by a vehicle, are provided.

A vehicle-based monitoring system of the disclosure includes a vehicle. The vehicle includes a first image capture device. The first image capture device captures a first image. The vehicle extends a feedback interval of the first image in response to a first included angle between a first line of sight of the first image capture device and a travel direction of the vehicle being greater than an angle threshold. The vehicle feedbacks the first image according to the feedback interval.

In an embodiment of the disclosure, the feedback interval is directly proportional to traveling speed of the vehicle.

In an embodiment of the disclosure, the vehicle further includes a second image capture device. The second image capture device captures a second image. The vehicle feedbacks multiple first image frames of the first image through multiple first time resources and feedbacks multiple second image frames of the second image through multiple second time resources.

In an embodiment of the disclosure, the vehicle releases at least one time resource from the first time resources in response to extending the feedback interval to omit feedback of a discarded image frame in the first image frames.

In an embodiment of the disclosure, the monitoring system further includes a server. The server is communicatively connected to the vehicle, in which the server outputs a stitched image according to the first image frames and the second image frames.

In an embodiment of the disclosure, the first image frames include a first frame corresponding to a first stitched image frame of the stitched image and a second frame corresponding to a second stitched image frame of the stitched image. The second image frames include a third frame corresponding to the first stitched image frame and a fourth frame corresponding to the second stitched image frame. In response to the second frame being the discarded image frame, the server updates the third frame in the first stitched image frame according to the fourth frame to generate the second stitched image frame.

In an embodiment of the disclosure, a second included angle between a second line of sight of the second image capture device and the travel direction is less than or equal to the angle threshold.

In an embodiment of the disclosure, the vehicle feedbacks the first image frames and the second image frames based on time division multiple access technology.

In an embodiment of the disclosure, the vehicle extends the feedback interval to a first time interval in response to the traveling speed of the vehicle being greater than a speed threshold. The vehicle extends the feedback interval to a second time interval in response to the traveling speed being less than or equal to the speed threshold. The first time interval is greater than the second time interval.

In an embodiment of the disclosure, the vehicle is a drone.

The vehicle-based monitoring method of the disclosure includes the following operation. A first image is captured by a first image capture device of a vehicle. A feedback interval of the first image is extended by the vehicle in response to a first included angle between a first line of sight of the first image capture device and a travel direction of the vehicle being greater than an angle threshold. The first image is fed back according to the feedback interval by the vehicle.

In an embodiment of the disclosure, the feedback interval is directly proportional to traveling speed of the vehicle.

In an embodiment of the disclosure, the monitoring method further includes the following operation. A second image is captured by a second image capture device of the vehicle. Multiple first image frames of the first image are fed back through multiple first time resources and multiple second image frames of the second image are fed back through multiple second time resources by the vehicle.

In an embodiment of the disclosure, the monitoring method further includes the following operation. At least one time resource is released from the first time resources by the vehicle in response to extending the feedback interval to omit feedback of a discarded image frame in the first image frames.

In an embodiment of the disclosure, the monitoring method further includes the following operation. A stitched image is output by the server according to the first image frames and the second image frames.

In an embodiment of the disclosure, the first image frames include a first frame corresponding to a first stitched image frame of the stitched image and a second frame corresponding to a second stitched image frame of the stitched image. The second image frames include a third frame corresponding to the first stitched image frame and a fourth frame corresponding to the second stitched image frame. The operation of outputting the stitched image includes the following operation. In response to the second frame being the discarded image frame, the third frame in the first stitched image frame is updated according to the fourth frame to generate the second stitched image frame.

In an embodiment of the disclosure, a second included angle between a second line of sight of the second image capture device and the travel direction is less than or equal to the angle threshold.

In an embodiment of the disclosure, the vehicle feedbacks the first image frames and the second image frames based on time division multiple access technology.

In an embodiment of the disclosure, the operation of extending the feedback interval of the first image includes the following operation. The feedback interval is extended to a first time interval in response to the traveling speed of the vehicle being greater than a speed threshold. The feedback interval is extended to a second time interval in response to the traveling speed being less than or equal to the speed threshold. The first time interval is greater than the second time interval.

A drone of the disclosure includes a first image capture device, a transceiver, and a processor. The first image capture device captures a first image. The processor is coupled to the first image capture device and the transceiver, in which the processor is configured to execute the following operation. A feedback interval of the first image is extended in response to a first included angle between a first line of sight of the first image capture device and a travel direction of the drone being greater than an angle threshold. The first image is fed back through the transceiver according to the feedback interval.

Based on the above, for the stitched image generated by multiple images fed back by the vehicle, the disclosure may update the portion of the stitched image corresponding to the travel direction of the vehicle at a higher frequency, to assist the operator in safely operating the vehicle.

DETAILED DESCRIPTION OF DISCLOSED EMBODIMENTS

Figure 1:
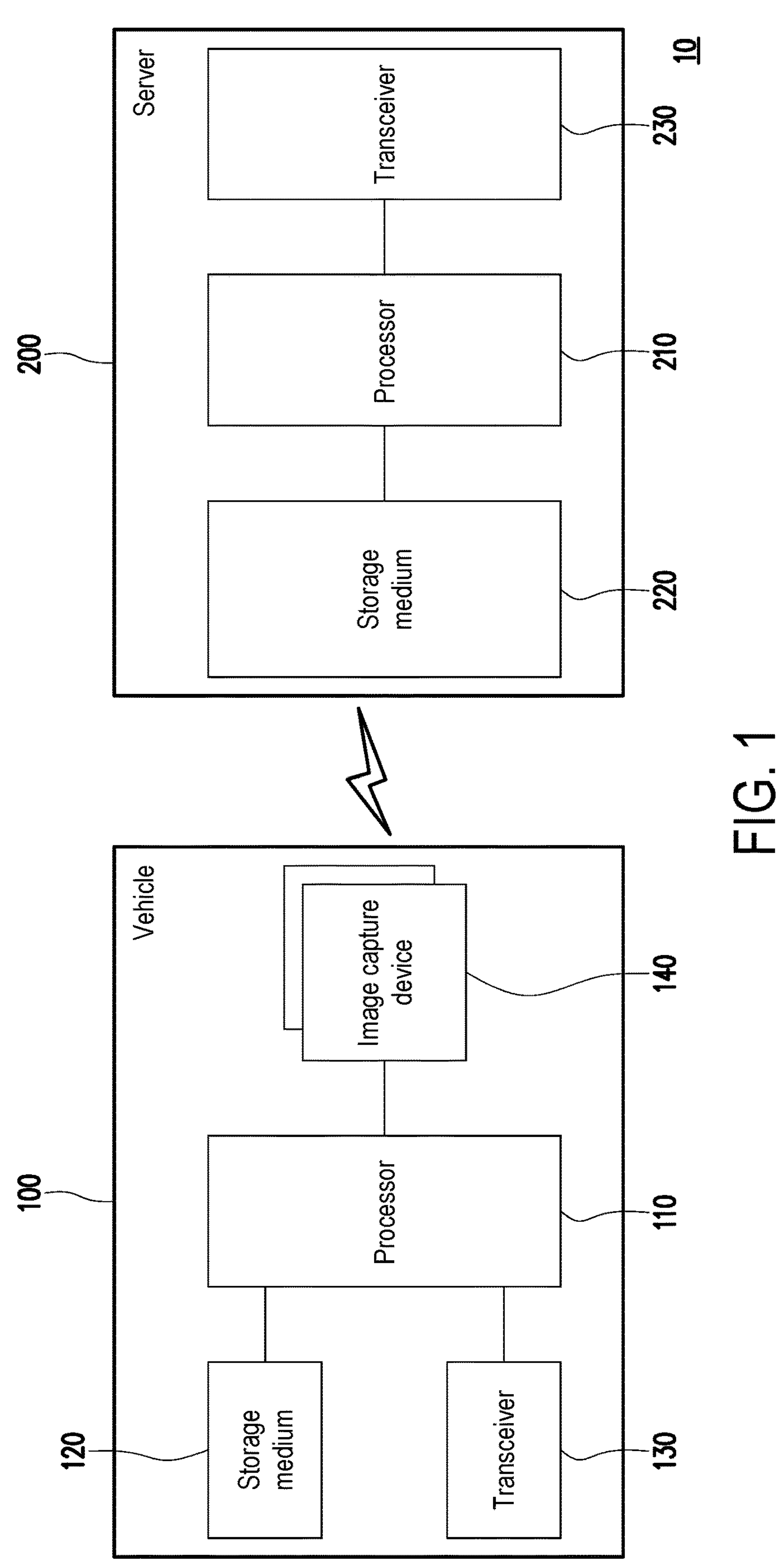
FIG. 1 shows a schematic diagram of a vehicle-based monitoring system according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 shows a schematic diagram of a vehicle-based monitoring system 10 according to an embodiment of the disclosure. The monitoring system 10 may include a vehicle 100 and a server 200, in which the vehicle 100 may be communicatively connected to the server 200.

The vehicle 100 may include a processor 110, a storage medium 120, a transceiver 130, and multiple image capture devices 140. The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements, or a combination of the elements thereof. The processor 110 may be coupled to the storage medium 120, the transceiver 130, and the image capture devices 140, and access and execute multiple modules and various application programs stored in the storage medium 120 to implement various functions of the vehicle 100. The processor 110 may be configured to control the elements in the vehicle 100 (e.g., driving motors or transmission elements, etc.) to move the vehicle 100.

The storage medium 120 is, for example, any type of fixed or removable random access memory (RAM), read-only memory (ROM), flash memory, hard disk drive (HDD), solid state drive (SSD), or similar elements, or a combination of the elements thereof configured to store multiple modules or various applications executable by the processor 110.

The transceiver 130 transmits and receives signals in a wireless manner. The transceiver 130 may also perform operations such as low noise amplification, impedance matching, frequency mixing, up or down frequency conversion, filtering, amplification, and the like. The processor 110 may communicate with the server 200 through the transceiver 130, so as to feedback the image captured by the image capture device 140 to the server 200. The processor 110 may receive commands from the server 200 or a remote controller through the transceiver 130 to operate the vehicle 100 according to the commands.

The image capture device 140 is, for example, a camera or a photographing device for capturing images. The image capture device 140 includes an image sensor such as a complementary metal oxide semiconductor (CMOS) or a charge coupled device (CCD). The image capture device 140 may be configured to capture images of the surrounding environment of the vehicle 100. Different image capture devices 140 may be configured to capture images in different directions.

The server 200 may include a processor 210, a storage medium 220, and a transceiver 230. The processor 210 is, for example, a central processing unit, or other programmable general-purpose or special-purpose micro control unit, microprocessor, digital signal processor, programmable controller, application specific integrated circuit, graphics processing unit, image signal processor, image processing unit, arithmetic logic unit, complex programmable logic device, field programmable gate array, or other similar elements, or a combination of the elements thereof. The processor 210 may be coupled to the storage medium 220 and the transceiver 230, and access and execute multiple modules and various application programs stored in the storage medium 220 to implement various functions of the server 200.

The storage medium 220 is, for example, any type of fixed or removable random access memory, read-only memory, flash memory, hard disk drive, solid state drive or similar elements, or a combination of the elements thereof configured to store multiple modules or various applications executable by the processor 210.

The transceiver 230 transmits and receives signals in a wireless manner. The transceiver 230 may also perform operations such as low noise amplification, impedance matching, frequency mixing, up or down frequency conversion, filtering, amplification, and the like. The processor 210 may communicate with the vehicle 100 through the transceiver 230 so as to send commands to the vehicle 100 to operate the vehicle. The processor 210 may also receive the image fed back by the vehicle 100 through the transceiver 230.

Figure 2:
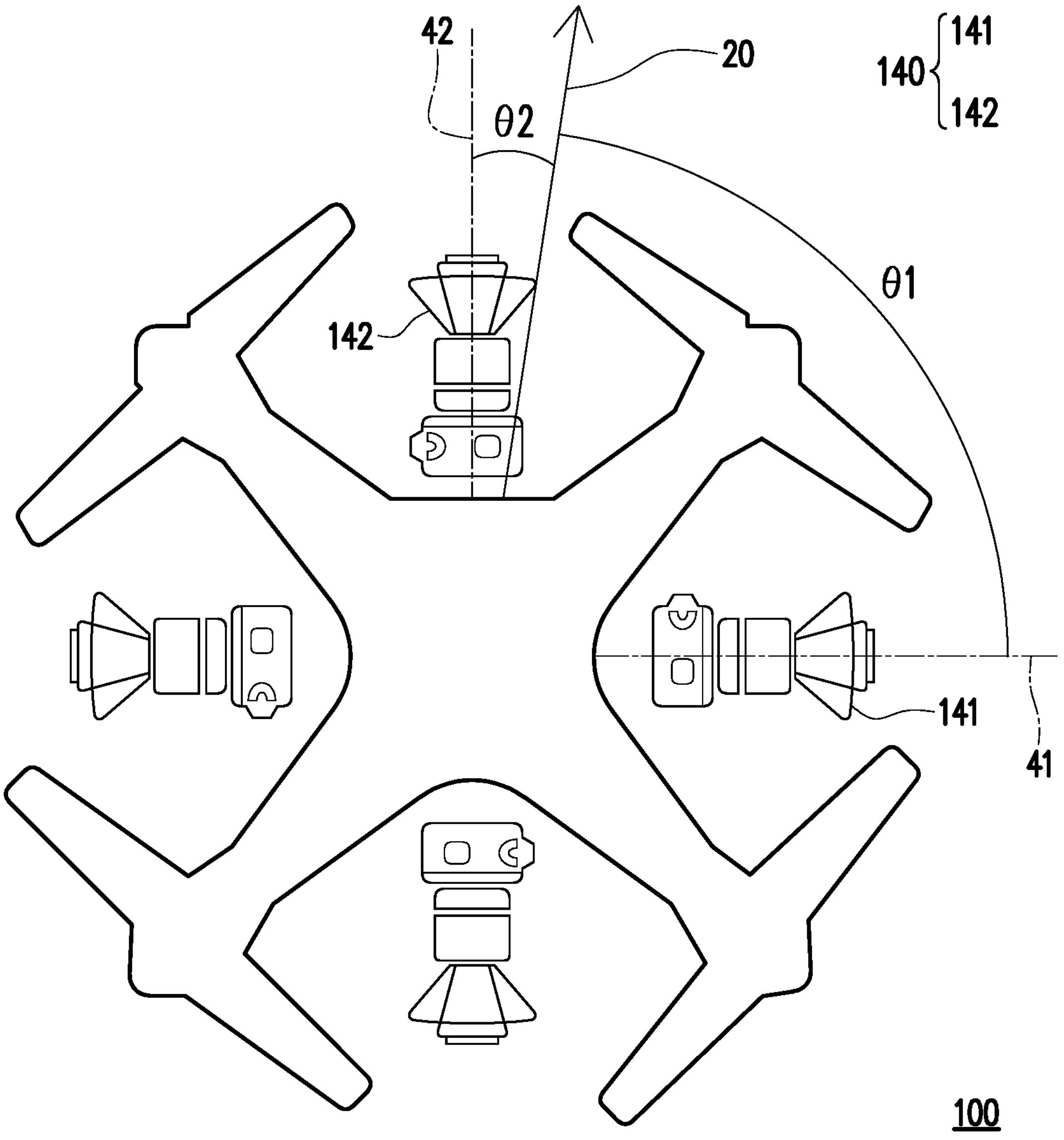
FIG. 2 shows a schematic diagram of a vehicle according to an embodiment of the disclosure.

FIG. 2 shows a schematic diagram of a vehicle 100 according to an embodiment of the disclosure. The vehicle 100 is, for example, an unmanned vehicle including a drone, but the disclosure is not limited thereto. For example, the vehicle 100 may include various types of aircraft (e.g., fixed-wing aircraft, helicopter, or multi-rotor aircraft), cars (e.g., racing cars, agricultural vehicles, or construction vehicles), or ships (e.g., sailboats or submarines). The vehicle 100 may include multiple image capture devices 140 to capture images from different directions. In this embodiment, the image capture device 140 may include an image capture device 141 and an image capture device 142.

Figure 3A:
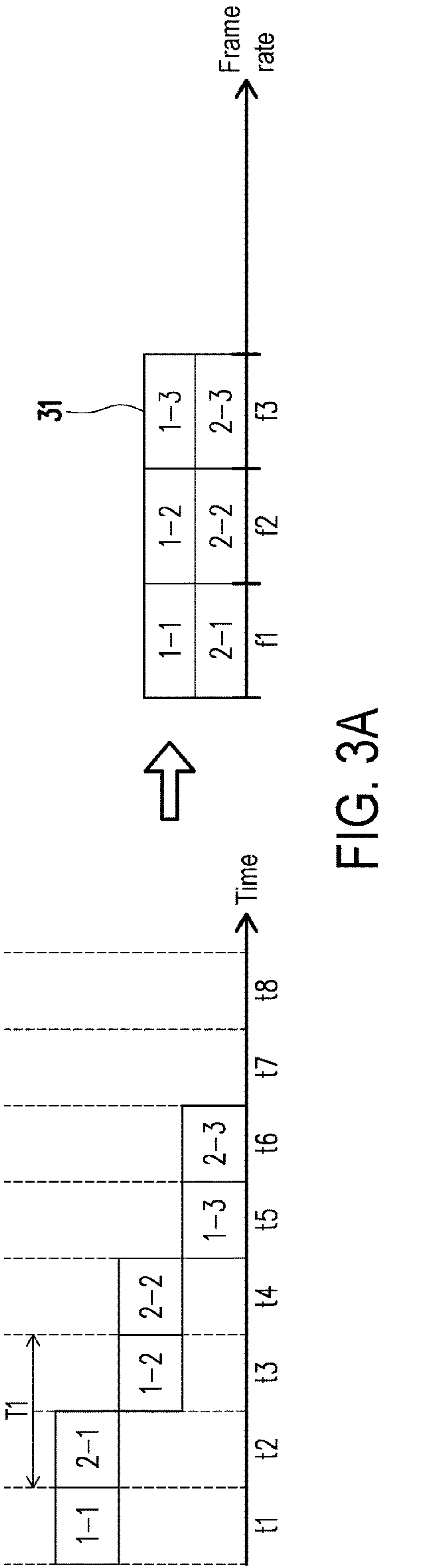
FIG. 3A, FIG. 3B, FIG. 3C and FIG. 3D show schematic diagrams illustrating allocation of network transmission resources and stitched images according to an embodiment of the disclosure.

FIG. 3A, FIG. 3B, FIG. 3C and FIG. 3D show schematic diagrams illustrating allocation of network transmission resources and stitched images according to an embodiment of the disclosure. Referring to FIG. 3A, the processor 110 may feedback the image captured by the image capture device 142 and the image captured by the image capture device 141 to the server 200 based on time division multiple access (TDMA) technology. Each of the aforementioned images may include multiple image frames respectively corresponding to different time periods.

The processor 110 may set the feedback interval as a time interval T1, and feedback the image frames captured by the image capture device 141 according to the feedback interval. The processor 110 may feedback multiple image frames of the image captured by the image capture device 142 through multiple time resources, and may feedback multiple image frames of the image captured by the image capture device 141 through multiple time resources. Specifically, the processor 110 may feedback the image frame 1-1 captured by the image capture device 142 through the time resource corresponding to the time period t1. Then, the processor 110 may feedback the image frame 2-1 captured by the image capture device 141 through the time resource corresponding to the time period t2. After the server 200 receives the image frame 1-1 and the image frame 2-1, the processor 210 of the server 200 may combine the image frame 1-1 and the image frame 2-1 into a stitched image frame f1 of the stitched image 31.

Next, the processor 110 may feedback the image frame 1-2 captured by the image capture device 142 through the time resource corresponding to the time period t3. Then, the processor 110 may feedback the image frame 2-2 captured by the image capture device 141 through the time resource corresponding to the time period t4, in which the time period t4 and the time period t2 are separated by a time interval T1. After the server 200 receives the image frame 1-2 and the image frame 2-2, the processor 210 of the server 200 may combine the image frame 1-2 and the image frame 2-2 into a stitched image frame f2 of the stitched image 31.

By analogy, the processor 110 may feedback the image frame 1-3 captured by the image capture device 142 through the time resource corresponding to the time period t5. Then, the processor 110 may feedback the image frame 2-3 captured by the image capture device 141 through the time resource corresponding to the time period t6, in which the time period t6 and the time period t4 are separated by a time interval T1. After the server 200 receives the image frame 1-3 and the image frame 2-3, the processor 210 of the server 200 may combine the image frame 1-3 and the image frame 2-3 into a stitched image frame f3 of the stitched image 31. The processor 210 may output the stitched image 31 including the stitched image frames f1, f2, and f3 for the operator of the vehicle 100 to view.

In the embodiment of FIG. 3A, the processor 110 allocates an equal amount of network transmission resources to the image capture device 142 and the image capture device 141. However, for the operational safety of the vehicle 100, the image captured by the image capture device 142 is more important than the image captured by the image capture device 141. Allocating excessive network transmission resources to the image capture device 141 may result in the waste of network transmission resources.

In order to improve the utilization efficiency of network transmission resources, the processor 110 of the vehicle 100 may determine how to allocate network transmission resources for the image capture device 141 and the image capture device 142 according to the travel direction of the vehicle 100. The processor 110 may determine the included angle between the line of sight of the image capture device 140 and the travel direction of the vehicle 100. If the included angle is greater than the angle threshold (e.g., 60 degrees), the processor 110 may extend the feedback interval of the image of the image capture device 140. If the included angle is less than or equal to the angle threshold, the processor 110 may not extend the feedback interval of the image of the image capture device 140.

Referring to FIG. 2, the processor 110 may determine the included angle θ1 between the travel direction 20 of the vehicle 100 and the line of sight (LOS) 41 of the image capture device 141, and may determine the included angle θ2 between the travel direction 20 and the line of sight 42 of the image capture device 142. The processor 110 may determine to extend the feedback interval of the images or image frames captured by the image capture device 141 in response to the included angle θ1 being greater than the angle threshold, so as to release the network transmission resources allocated to the multiple image frames fed back by the image capture device 141. The processor 110 may release at least one time resource from multiple time resources allocated to the image frames in response to extending the feedback interval of the image capture device 141 to omit the feedback of the discarded image frames in the image frames.

Figure 3B:
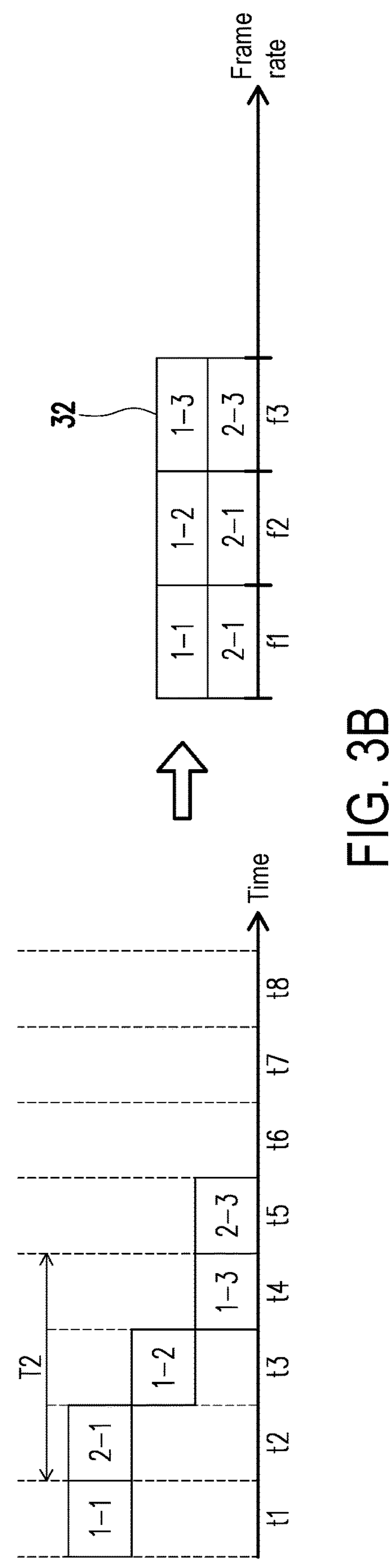
Figures 3C, 3D:
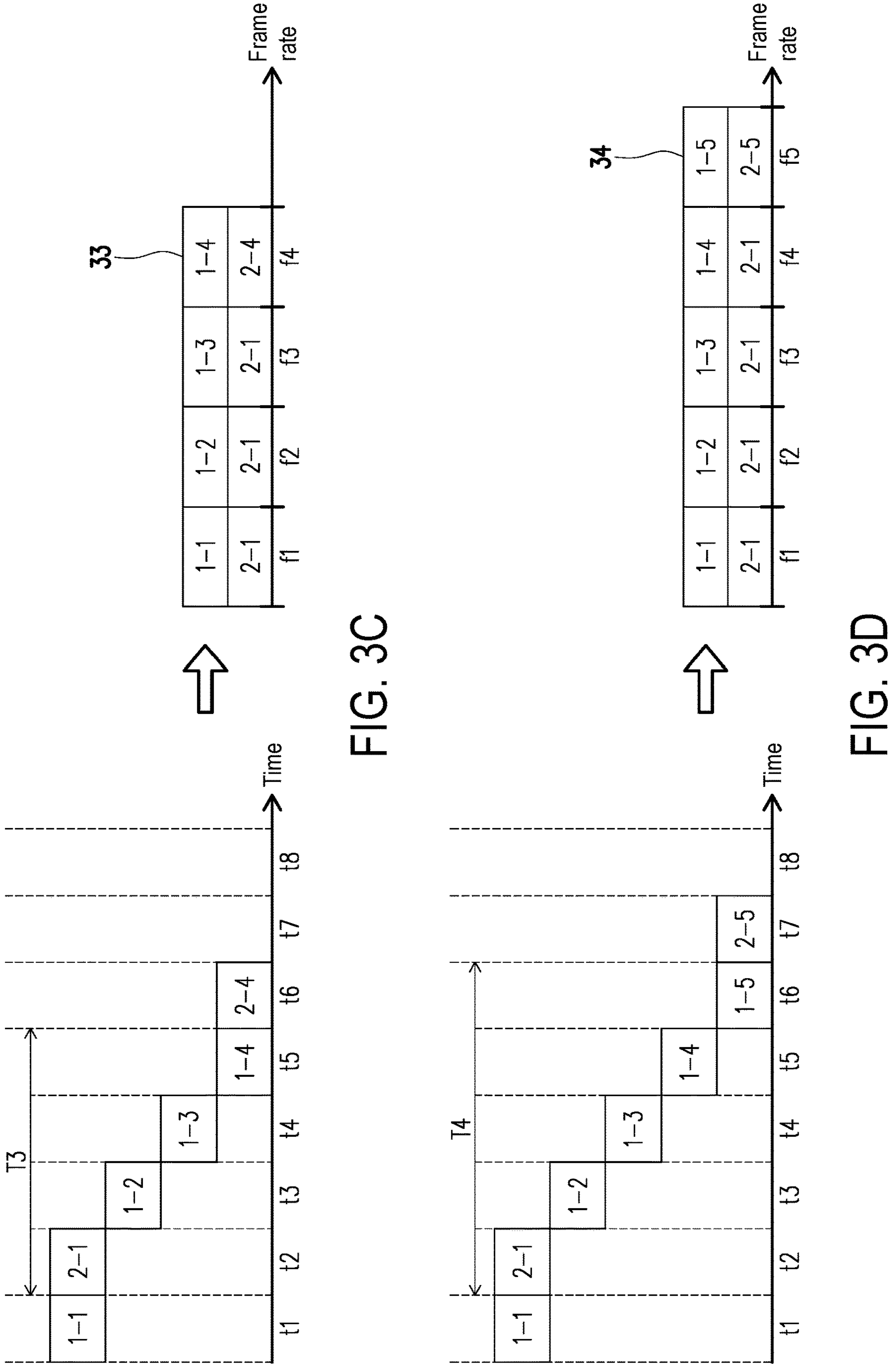

In one embodiment, the processor 110 may determine how to extend the feedback interval according to the traveling speed of the vehicle 100. The faster the traveling speed, the longer the feedback interval. In other words, the feedback interval may be directly proportional to the traveling speed of the vehicle 100. FIG. 3B, FIG. 3C and FIG. 3D respectively show the allocation of network transmission resources of the vehicle 100 with different traveling speeds. The traveling speed corresponding to FIG. 3B is less than or equal to the first speed threshold (e.g., 30 km/h), the traveling speed corresponding to FIG. 3C is greater than the first speed threshold and less than or equal to the second speed threshold (e.g., 60 km/h), and the traveling speed corresponding to FIG. 3D is greater than the second speed threshold. In FIG. 3B, the feedback interval of the image capture device 141 is extended to a time interval T2 based on the traveling speed. In FIG. 3C, the feedback interval of the image capture device 141 is extended to a time interval T3 based on the traveling speed. In FIG. 3D, the feedback interval of the image capture device 141 is extended to a time interval T4 based on the traveling speed. The time interval T4 is greater than the time interval T3, and the time interval T3 is greater than the time interval T2.

Referring to FIG. 3A and FIG. 3B, the processor 110 may extend the feedback interval of the image capture device 141 from the time interval T1 to the time interval T2 according to the traveling speed of the vehicle 100, and feedback the image frames captured by the image capture device 141 according to the feedback interval. The processor 110 may release a time resource corresponding to the time period t4 from multiple time resources (i.e., multiple time resources respectively corresponding to time periods t2, t4 and t6) allocated to the image capture device 141 in response to extending the feedback interval of the image capture device 141, thereby omitting the feedback of the image frame 2-2, in which the image frame 2-2 is a discarded image frame. The released time resource corresponding to the time period t4 is used for feedback of the image frame 1-3. Since the server 200 may only receive image frames 1-1, 2-1, 1-2, 1-3, and 2-3, the server 200 may generate the stitched image 32 according to the image frames 1-1, 2-1, 1-2, 1-3, and 2-3.

In detail, the processor 110 may feedback the image frame 1-1 captured by the image capture device 142 through the time resource corresponding to the time period t1. Then, the processor 110 may feedback the image frame 2-1 captured by the image capture device 141 through the time resource corresponding to the time period t2. After the server 200 receives the image frame 1-1 and the image frame 2-1, the processor 210 of the server 200 may combine the image frame 1-1 and the image frame 2-1 into a stitched image frame f1 of the stitched image 31.

Next, the processor 110 may feedback the image frame 1-2 captured by the image capture device 142 through the time resource corresponding to the time period t3. Since the image frame 2-2 of the stitched image frame f2 originally used to generate the stitched image 31 is a discarded image frame, the server 200 may only receive the image frame 1-2 fed back by the image capture device 142, but cannot receive to the image frame 2-2 fed back by the image capture device 141. Accordingly, the server 200 may update the stitched image frame f1 of the stitched image 32 according to the image frame 1-2 (i.e., using the image frame 1-2 to replace the image frame 1-1 in the stitched image frame f1) to generate the stitched image frame f2 of the stitched image 32.

Furthermore, the processor 110 may feedback the image frame 1-3 captured by the image capture device 142 through the time resource corresponding to the time period t4. Then, the processor 110 may feedback the image frame 2-3 captured by the image capture device 141 through the time resource corresponding to the time period t5, in which the time period t5 and the time period t2 are separated by a time interval T2. After the server 200 receives the image frame 1-3 and the image frame 2-3, the processor 210 of the server 200 may update the stitched image frame f2 of the stitched image 32 according to the image frame 1-3 and the image frame 2-3 to generate a stitched image frame f3 of the stitched image 32. The processor 210 may output the stitched image 32 including the stitched image frames f1, f2, and f3 for the operator of the vehicle 100 to view.

Referring to FIG. 3A and FIG. 3C, the processor 110 may extend the feedback interval of the image capture device 141 from the time interval T1 to the time interval T3 according to the traveling speed of the vehicle 100, and feedback the image frames captured by the image capture device 141 according to the feedback interval. The processor 110 may release time resources corresponding to the time period t4 and the time period t6 from multiple time resources (i.e., multiple time resources respectively corresponding to time periods t2, t4 and t6) allocated to the image capture device 141 in response to extending the feedback interval of the image capture device 141, thereby omitting the feedback of the image frame 2-2 and the image frame 2-3, in which the image frame 2-2 and the image frame 2-3 are discarded image frames. The released time resource corresponding to the time period t4 is used for the feedback of the image frame 1-3, and the released time resource corresponding to the time period t6 is used for the feedback of the image frame 2-4. Since the server 200 may only receive image frames 1-1, 2-1, 1-2, 1-3, 1-4, and 2-4, the server 200 may generate the stitched image 33 according to the image frames 1-1, 2-1, 1-2, 1-3, 1-4, and 2-4.

In detail, the processor 110 may feedback the image frame 1-1 captured by the image capture device 142 through the time resource corresponding to the time period t1. Then, the processor 110 may feedback the image frame 2-1 captured by the image capture device 141 through the time resource corresponding to the time period t2. After the server 200 receives the image frame 1-1 and the image frame 2-1, the processor 210 of the server 200 may combine the image frame 1-1 and the image frame 2-1 into a stitched image frame f1 of the stitched image 32.

Next, the processor 110 may feedback the image frame 1-2 captured by the image capture device 142 through the time resource corresponding to the time period t3. Since the image frame 2-2 of the stitched image frame f2 originally used to generate the stitched image 31 is a discarded image frame, the server 200 may only receive the image frame 1-2 fed back by the image capture device 142, but cannot receive to the image frame 2-2 fed back by the image capture device 141. Accordingly, the server 200 may update the stitched image frame f1 of the stitched image 33 according to the image frame 1-2 (i.e., using the image frame 1-2 to replace the image frame 1-1 in the stitched image frame f1) to generate the stitched image frame f2 of the stitched image 33.

Then, the processor 110 may feedback the image frame 1-3 captured by the image capture device 142 through the time resource corresponding to the time period t4. Since the image frame 2-3 of the stitched image frame f3 originally used to generate the stitched image 31 is a discarded image frame, the server 200 may only receive the image frame 1-3 fed back by the image capture device 142, but cannot receive to the image frame 2-3 fed back by the image capture device 141. Accordingly, the server 200 may update the stitched image frame f2 of the stitched image 33 according to the image frame 1-3 (i.e., using the image frame 1-3 to replace the image frame 1-2 in the stitched image frame f2) to generate the stitched image frame f3 of the stitched image 33.

Furthermore, the processor 110 may feedback the image frame 1-4 captured by the image capture device 142 through the time resource corresponding to the time period t5. Then, the processor 110 may feedback the image frame 2-4 captured by the image capture device 141 through the time resource corresponding to the time period t6, in which the time period t6 and the time period t2 are separated by a time interval T3. After the server 200 receives the image frame 1-4 and the image frame 2-4, the processor 210 of the server 200 may update the stitched image frame f3 of the stitched image 33 according to the image frame 1-4 and the image frame 2-4 to generate a stitched image frame f4 of the stitched image 33. The processor 210 may output the stitched image 33 including the stitched image frames f1, f2, f3, and f4 for the operator of the vehicle 100 to view.

Referring to FIG. 3A and FIG. 3D, the processor 110 may extend the feedback interval of the image capture device 141 from the time interval T1 to the time interval T4 according to the traveling speed of the vehicle 100, and feedback the image frames captured by the image capture device 141 according to the feedback interval. The processor 110 may release time resources corresponding to the time period t4, the time period t6, and the time period t8 from multiple time resources (i.e., multiple time resources respectively corresponding to time periods t2, t4, t6, and t8) allocated to the image capture device 141 in response to extending the feedback interval of the image capture device 141, thereby omitting the feedback of the image frame 2-2, the image frame 2-3, and the image frame 2-4 (not shown in FIG. 3A), in which the image frame 2-2, the image frame 2-3, and the image frame 2-4 are discarded image frames. The released time resource corresponding to the time period t4 is used for the feedback of the image frame 1-3, and the released time resource corresponding to the time period t6 is used for the feedback of the image frame 1-5. Since the server 200 may only receive image frames 1-1, 2-1, 1-2, 1-3, 1-4, 1-5, and 2-5, the server 200 may generate the stitched image 34 according to the image frames 1-1, 2-1, 1-2, 1-3, 1-4, 1-5, and 2-5.

In detail, the processor 110 may feedback the image frame 1-1 captured by the image capture device 142 through the time resource corresponding to the time period t1. Then, the processor 110 may feedback the image frame 2-1 captured by the image capture device 141 through the time resource corresponding to the time period t2. After the server 200 receives the image frame 1-1 and the image frame 2-1, the processor 210 of the server 200 may combine the image frame 1-1 and the image frame 2-1 into a stitched image frame f1 of the stitched image 33.

Next, the processor 110 may feedback the image frame 1-2 captured by the image capture device 142 through the time resource corresponding to the time period t3. Since the image frame 2-2 of the stitched image frame f2 originally used to generate the stitched image 31 is a discarded image frame, the server 200 may only receive the image frame 1-2 fed back by the image capture device 142, but cannot receive to the image frame 2-2 fed back by the image capture device 141. Accordingly, the server 200 may update the stitched image frame f1 of the stitched image 34 according to the image frame 1-2 (i.e., using the image frame 1-2 to replace the image frame 1-1 in the stitched image frame f1) to generate the stitched image frame f2 of the stitched image 34.

Then, the processor 110 may feedback the image frame 1-3 captured by the image capture device 142 through the time resource corresponding to the time period t4. Since the image frame 2-3 of the stitched image frame f3 originally used to generate the stitched image 31 is a discarded image frame, the server 200 may only receive the image frame 1-3 fed back by the image capture device 142, but cannot receive to the image frame 2-3 fed back by the image capture device 141. Accordingly, the server 200 may update the stitched image frame f2 of the stitched image 34 according to the image frame 1-3 (i.e., using the image frame 1-3 to replace the image frame 1-2 in the stitched image frame f2) to generate the stitched image frame f3 of the stitched image 34.

In addition, the processor 110 may feedback the image frame 1-4 captured by the image capture device 142 through the time resource corresponding to the time period t5. Since the image frame 2-4 of the stitched image frame f4 (not shown in FIG. 3A) originally used to generate the stitched image 31 is a discarded image frame, the server 200 may only receive the image frame 1-4 fed back by the image capture device 142, but cannot receive to the image frame 2-4 fed back by the image capture device 141. Accordingly, the server 200 may update the stitched image frame f3 of the stitched image 34 according to the image frame 1-4 (i.e., using the image frame 1-4 to replace the image frame 1-3 in the stitched image frame f3) to generate the stitched image frame f4 of the stitched image 34.

Furthermore, the processor 110 may feedback the image frame 1-5 captured by the image capture device 142 through the time resource corresponding to the time period t6. Then, the processor 110 may feedback the image frame 2-5 captured by the image capture device 141 through the time resource corresponding to the time period t7, in which the time period t7 and the time period t2 are separated by a time interval T4. After the server 200 receives the image frame 1-5 and the image frame 2-5, the processor 210 of the server 200 may update the stitched image frame f4 of the stitched image 34 according to the image frame 1-5 and the image frame 2-5 to generate a stitched image frame f5 of the stitched image 34. The processor 210 may output the stitched image 34 including the stitched image frames f1, f2, f3, f4, and f5 for the operator of the vehicle 100 to view.

Figure 4:
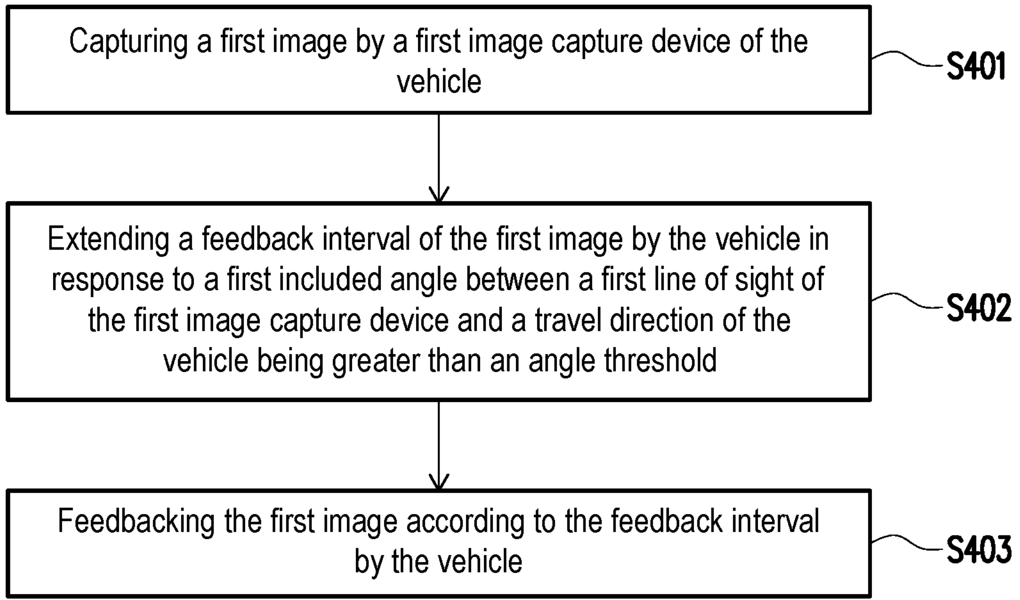
FIG. 4 shows a flowchart of a vehicle-based monitoring method according to an embodiment of the disclosure.

FIG. 4 shows a flowchart of a vehicle-based monitoring method according to an embodiment of the disclosure, in which the monitoring method may be implemented by the monitoring system 10 shown in FIG. 1. In step S401, a first image is captured by the first image capture device of the vehicle. In step S402, a feedback interval of the first image is extended by the vehicle in response to a first included angle between a first line of sight of the first image capture device and a travel direction of the vehicle being greater than an angle threshold. In step S403, the first image is fed back according to the feedback interval by the vehicle.

To sum up, the vehicle of the disclosure may be provided with multiple image capture devices to feedback image data in different directions to the server, for the server to generate stitched images. The vehicle may allocate different network transmission resources for the images of each image capture device according to the travel direction. Since the image corresponding to the travel direction of the vehicle is critical to the safety of the vehicle, the vehicle may allocate the most network transmission resources to feedback the image. For images in other directions, the vehicle may reduce the network transmission resources allocated to the images, thereby improving the network transmission efficiency of the images. Accordingly, the disclosure may update the portion of the stitched image corresponding to the travel direction at a higher frequency, to assist the operator in safely operating the vehicle.

What is claimed is:

1. A vehicle based monitoring system, comprising:

a vehicle, comprising a first image capture device, wherein the first image capture device captures a first image, wherein the vehicle extends a feedback interval of the first image in response to a first included angle between a first line of sight of the first image capture device and a travel direction of the vehicle being greater than an angle threshold, wherein the vehicle feedbacks the first image according to the feedback interval, wherein the vehicle further comprises:

a second image capture device, capturing a second image, wherein the vehicle feedbacks a plurality of first image frames of the first image through a plurality of first time resources and feedbacks a plurality of second image frames of the second image through a plurality of second time resources.

2. The vehicle based monitoring system according to claim 1, wherein the feedback interval is directly proportional to traveling speed of the vehicle.

3. The vehicle based monitoring system according to claim 1, wherein the vehicle releases at least one time resource from the first time resources in response to extending the feedback interval to omit feedback of a discarded image frame in the first image frames.

4. The vehicle based monitoring system according to claim 3, further comprising:

a server, communicatively connected to the vehicle, wherein the server outputs a stitched image according to the first image frames and the second image frames.

5. The vehicle based monitoring system according to claim 4, wherein the first image frames comprise a first frame corresponding to a first stitched image frame of the stitched image and a second frame corresponding to a second stitched image frame of the stitched image, wherein the second image frames comprise a third frame corresponding to the first stitched image frame and a fourth frame corresponding to the second stitched image frame, wherein the server updates the third frame in the first stitched image frame according to the fourth frame in response to the second frame being the discarded image frame to generate the second stitched image frame.

6. The vehicle based monitoring system according to claim 1, wherein a second included angle between a second line of sight of the second image capture device and the travel direction is less than or equal to the angle threshold.

7. The vehicle based monitoring system according to claim 1, wherein the vehicle feedbacks the first image frames and the second image frames based on time division multiple access technology.

8. The vehicle based monitoring system according to claim 1, wherein the vehicle extends the feedback interval to a first time interval in response to traveling speed of the vehicle being greater than a speed threshold, wherein the vehicle extends the feedback interval to a second time interval in response to the traveling speed being less than or equal to the speed threshold, wherein the first time interval is greater than the second time interval.

9. The vehicle based monitoring system according to claim 1, wherein the vehicle is a drone.

10. A vehicle based monitoring method, comprising:

capturing a first image by a first image capture device of a vehicle;

extending a feedback interval of the first image by the vehicle in response to a first included angle between a first line of sight of the first image capture device and a travel direction of the vehicle being greater than an angle threshold; and feedbacking the first image according to the feedback interval by the vehicle, wherein the vehicle based monitoring method further comprises:

capturing a second image by a second image capture device of the vehicle; and feedbacking a plurality of first image frames of the first image through a plurality of first time resources and feedbacking a plurality of second image frames of the second image through a plurality of second time resources by the vehicle.

11. The vehicle based monitoring method according to claim 10, wherein the feedback interval is directly proportional to traveling speed of the vehicle.

12. The vehicle based monitoring method according to claim 10, further comprising:

releasing at least one time resource from the first time resources by the vehicle in response to extending the feedback interval to omit feedback of a discarded image frame in the first image frames.

13. The vehicle based monitoring method according to claim 12, further comprising:

outputting a stitched image by a server according to the first image frames and the second image frames.

14. The vehicle based monitoring method according to claim 13, wherein the first image frames comprise a first frame corresponding to a first stitched image frame of the stitched image and a second frame corresponding to a second stitched image frame of the stitched image, wherein the second image frames comprise a third frame corresponding to the first stitched image frame and a fourth frame corresponding to the second stitched image frame, wherein outputting the stitched image comprises:

updating the third frame in the first stitched image frame according to the fourth frame in response to the second frame being the discarded image frame to generate the second stitched image frame.

15. The vehicle based monitoring method according to claim 10, wherein a second included angle between a second line of sight of the second image capture device and the travel direction is less than or equal to the angle threshold.

16. The vehicle based monitoring method according to claim 10, wherein the vehicle feedbacks the first image frames and the second image frames based on time division multiple access technology.

17. The vehicle based monitoring method according to claim 10, wherein extending the feedback interval of the first image comprises:

extending the feedback interval to a first time interval in response to traveling speed of the vehicle being greater than a speed threshold; and extending the feedback interval to a second time interval in response to the traveling speed being less than or equal to the speed threshold, wherein the first time interval is greater than the second time interval.

18. A drone, comprising:

a first image capture device, capturing a first image;

a transceiver; and a processor, coupled to the first image capture device and the transceiver, wherein the processor is configured to execute:

extending a feedback interval of the first image in response to a first included angle between a first line of sight of the first image capture device and a travel direction of the drone being greater than an angle threshold; and feedbacking the first image through the transceiver according to the feedback interval, wherein the processor is further configured to execute:

capturing a second image by a second image capture device of the vehicle; and feedbacking a plurality of first image frames of the first image through a plurality of first time resources and feedbacking a plurality of second image frames of the second image through a plurality of second time resources by the vehicle.

* * * * *